United States Patent
Taniwa et al.

(10) Patent No.: US 8,221,096 B2
(45) Date of Patent: Jul. 17, 2012

(54) COMPRESSOR ARRANGEMENT WITH STATOR WELDED TO A HOUSING

(75) Inventors: Hiroyuki Taniwa, Kusatsu (JP);
Masahide Higuchi, Kusatsu (JP);
Hideki Mori, Oumihachiman (JP);
Yasukazu Nabetani, Kusatsu (JP);
Azusa Ujihara, Kusatsu (JP)

(73) Assignee: Daikin Industries, Ltd., Osaka (JP)

( * ) Notice: Subject to any disclaimer, the term of this patent is extended or adjusted under 35 U.S.C. 154(b) by 340 days.

(21) Appl. No.: 12/294,065

(22) PCT Filed: Mar. 15, 2007

(86) PCT No.: PCT/JP2007/055181
§ 371 (c)(1),
(2), (4) Date: Sep. 23, 2008

(87) PCT Pub. No.: WO2007/111141
PCT Pub. Date: Oct. 4, 2007

(65) Prior Publication Data
US 2009/0123308 A1    May 14, 2009

(30) Foreign Application Priority Data

Mar. 24, 2006    (JP) .................................. 2006-082005

(51) Int. Cl.
*F04B 39/12*    (2006.01)
*H02K 5/24*    (2006.01)
(52) U.S. Cl. ................ 417/410.3; 310/216.136; 310/89; 310/51
(58) Field of Classification Search .............. 417/410.1, 417/410.3; 310/89, 216.136, 216.137, 216.113, 310/51
See application file for complete search history.

(56) References Cited

U.S. PATENT DOCUMENTS

| | | | |
|---|---|---|---|
| 3,546,504 A * | 12/1970 | Bottle et al. | 310/51 |
| 6,631,617 B1 * | 10/2003 | Dreiman et al. | 62/84 |
| 7,030,540 B2 * | 4/2006 | Ida et al. | 310/316.01 |
| 7,186,029 B2 | 3/2007 | Takei et al. | |
| 7,617,605 B2 * | 11/2009 | Fochtman et al. | 29/890.131 |
| 2004/0219037 A1 | 11/2004 | Higuchi et al. | |
| 2005/0067915 A1 * | 3/2005 | Ida et al. | 310/217 |

FOREIGN PATENT DOCUMENTS

| | | | |
|---|---|---|---|
| JP | 56-169513 U | | 12/1981 |
| JP | 59-101292 A | | 6/1984 |
| JP | 59101292 A | * | 6/1984 |
| JP | 62199974 A | * | 9/1987 |
| JP | 01-198253 A | | 8/1989 |
| JP | 03-124247 A | | 5/1991 |
| JP | 11-336685 A | | 12/1999 |
| JP | 2003-262192 A | | 9/2003 |
| JP | 2003-324869 A | | 11/2003 |
| JP | 2004-92738 A | | 3/2004 |

OTHER PUBLICATIONS

English Abstract for JP62199974A.*
English Abstract for JP59101292A.*

* cited by examiner

*Primary Examiner* — Devon C Kramer
*Assistant Examiner* — Nathan Zollinger
(74) *Attorney, Agent, or Firm* — Global IP Counselors

(57) ABSTRACT

A compressor has stator of a motor is installed in a closed container, on two planes normal to the center axis $1a$ of the container. On each of the planes, the stator is welded to the container at three welding points. This mounting arrangement on two planes with three welding points on each plane minimizes the amount of movement of the stator in the direction of the center axis.

6 Claims, 10 Drawing Sheets

COMPRESSOR ARRANGEMENT WITH STATOR WELDED TO A HOUSING

CROSS-REFERENCE TO RELATED APPLICATIONS

This U.S. National stage application claims priority under 35 U.S.C. §119(a) to Japanese Patent Application No. 2006-082005, filed in Japan on Mar. 24, 2006, the entire contents of which are hereby incorporated herein by reference.

TECHNICAL FIELD

The present invention relates to a compressor to be used for air conditioners, refrigerators or the like.

BACKGROUND ART

Conventionally, a compressor has a closed container, a compression element placed in the closed container, and a motor placed in the closed container to drive the compression element via a shaft. A stator of the motor is welded to the closed container at a vertically central portion of the stator (see JP 2003-262192 A).

DISCLOSURE OF INVENTION

Subject to be Solved by the Invention

However, since the central portion of the stator is welded to the closed container, the stator may largely move in the vertical direction relative to the closed container.

More specifically, the stator is formed from multilayered steel plates, so that a large number of the steel plates are provided between the central portion of the stator, which is welded to the closed container, and the upper or lower ends of the stator. Thus, the steel plates provided therebetween may be loosened apart from one another to incur large amounts of vertical movement.

As the result, due to pressure pulsations of the refrigerant within the closed container, the steel plates vibrates to large extents, resulting in a problem of increased operating noise of the motor.

A subject of the present invention is therefore to provide such a low-noise compressor that reduces stator vibrations caused by pressure pulsations in a closed container and decreases operating noise from a motor of the compressor.

Means for Solving the Subject

In order to solve the above-stated subject, the present invention provides a compressor comprising:
a closed container;
a compression element placed in the closed container; and
a motor placed within the closed container and driving the compression element via a shaft, wherein
a stator of the motor is attached to the closed container on at least two planes normal to a center axis of the closed container, and
the stator is welded to the closed container at least three welding points on each of the planes.

In the compressor according to this invention, the stator is attached to the closed container on at least two planes normal to the center axis of the closed container, and on each of the planes, the stator is welded to the closed container at least three welding points. Therefore, it is possible to reduce the amount of movement of the stator in the center axis direction relative to the closed container.

Specifically, the stator is formed from multilayered steel plates, and it is possible to reduce the amount of steel plates provided between the fixed portion of the stator attached to the closed container and end portions of the stator in the center axis direction. This structure can reduce movements of loosened steel plates therebetween in the direction of the center axis.

Thus, it is possible to reduce vibrations of the stator caused by pressure pulsations of the refrigerant in the closed container, so that this allows realization of a low-noise compressor due to reduction in operation noise of the motor.

In the compressor according to one embodiment, the stator has multilayered steel plates, and neighboring steel plates of the steel plates are bonded to each other with insulating adhesive.

The insulating adhesive is epoxy-based varnish for example.

In the compressor according to this embodiment, since neighboring steel plates of the stator are bonded to each other with the insulating adhesive, the plurality of steel plates do not become loosened apart from one another. Thus, the rigidity of the stator is improved, which makes it possible to further reduce the vibrations of the stator caused by pressure pulsations in the closed container and to thereby further reduce the operating noise of the motor.

The present invention also provides a compressor comprising:
a closed container;
a compression element placed in the closed container; and
a motor placed in the closed container and driving the compression element via a shaft, wherein
a stator of the motor is attached to the closed container on one plane normal to a center axis of the closed container,
the stator is welded to the closed container at least three welding points on the one plane,
the stator has multilayered steel plates, and
neighboring steel plates of the steel plates are bonded to each other with insulating adhesive.

In the compressor according to the invention, the stator is attached to the closed container on one plane normal to the center axis of the closed container, and the stator is welded to the closed container at least three welding points on the one plane. Further, neighboring steel plates of the stator are bonded to each other with the insulating adhesive, which makes it possible to reduce movement of the stator in the center axis direction relative to the closed container.

That is, the steel plates do not become loosened apart from one another, so that the rigidity of the stator is improved. This makes it possible to reduce the vibrations of the stator caused by pressure pulsations of the refrigerant in the closed container and to provide a low-noise compressor in which the operating noise of the motor is reduced.

In the compressor according to one embodiment, carbon dioxide is used as a refrigerant in the closed container.

In the compressor according this embodiment, carbon dioxide is used as the refrigerant in the closed container, and the carbon dioxide refrigerant becomes high pressure in the closed container. However, the compressor can reduce vibrations of the stator due to pressure pulsations of the refrigerant, so that the operating noise of the motor is reduced.

Effects of the Invention

In the compressor according to the invention, the stator is attached to the closed container on at least two planes normal to the center axis of the closed container, and the stator is welded to the closed container at least three welding points on each of the planes. Therefore, it is possible to reduce vibrations of the stator caused by pressure pulsations of the refrigerant in the closed container, which allows realization of a low-noise compressor due to reduction in operation noise of the motor.

Also, in the compressor according to the invention, the stator is attached to the closed container on one plane normal to the center axis of the closed container, and the stator is welded to the closed container at least three welding points on the one plane, and moreover neighboring steel plates of the stator are bonded to each other with insulating adhesive. Therefore, it is possible to reduce vibrations of the stator caused by pressure pulsations of the refrigerant in the closed container, which allows realization of a low-noise compressor due to reduction in operation noise of the motor.

DETAILED DESCRIPTION OF THE INVENTION

Hereinbelow, the present invention will be described in detail by way of embodiments with reference to the accompanying drawings.

First Embodiment

Figure 1:
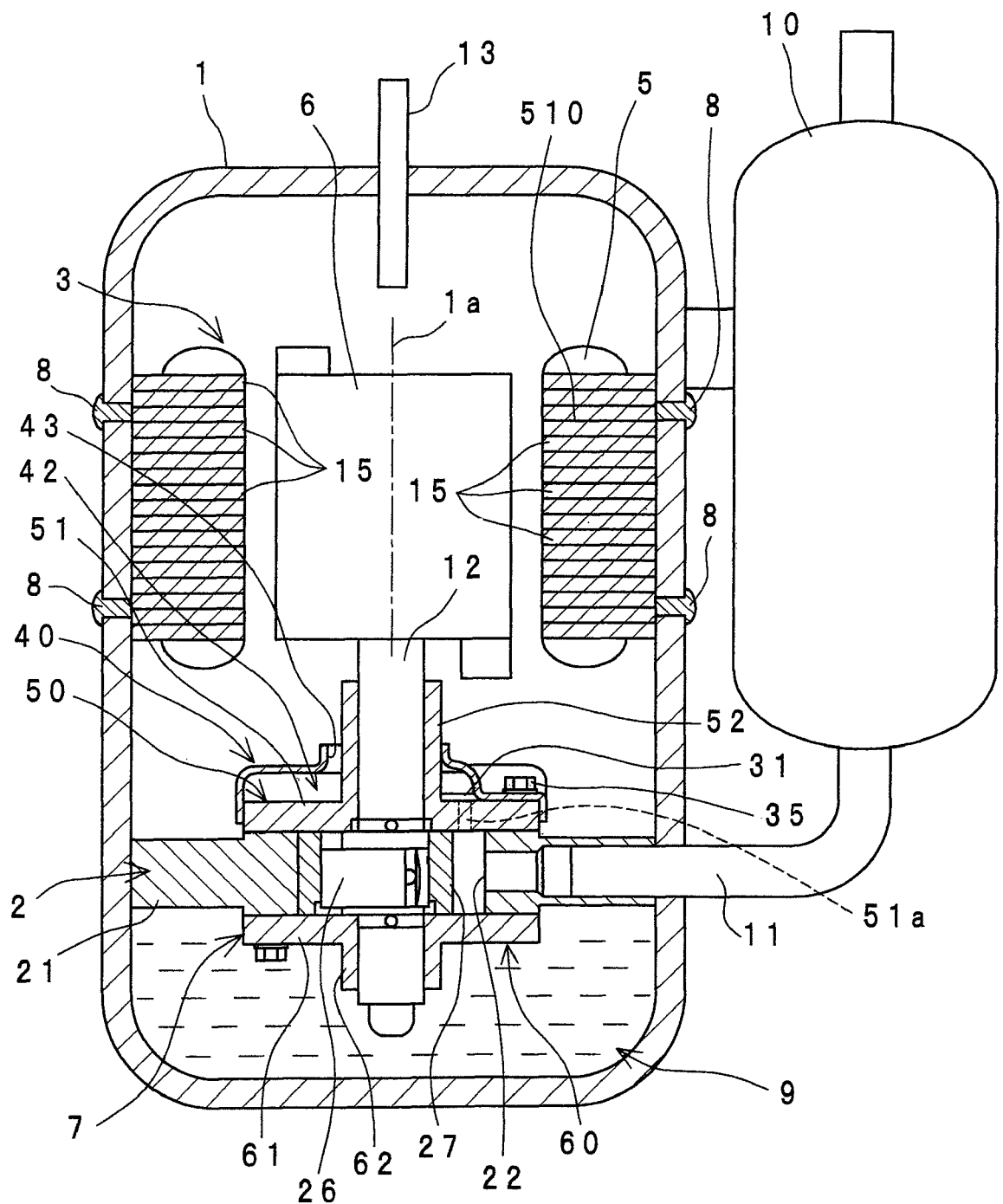
FIG. 1 shows a longitudinal sectional view of a compressor according to a first embodiment of the present invention.

FIG. 1 shows a sectional view of a compressor according to a first embodiment of the present invention. The compressor has a closed container 1, a compression element 2 placed in the closed container 1, and a motor 3 placed in the closed container 1 to drive the compression element 2 via a shaft 12.

The compressor is a so-called high-pressure dome-type rotary compressor, where the compression element 2 and the motor 3 are respectively placed on the upper and lower sides in the closed container 1. A rotor 6 of the motor 3 drives the compression element 2 via the shaft 12.

The compression element 2 sucks in a refrigerant gas from an accumulator 10 through a suction pipe 11. The refrigerant gas can be obtained by controlling unshown condenser, expansion mechanism and evaporator that constitute an air conditioner as an example of a refrigeration system in combination with the compressor.

The refrigerant gas, which is carbon dioxide, becomes as high a pressure as about 12 MPa within the closed container 1. Instead of carbon dioxide, R410A or R22 may be used as the refrigerant.

A high-temperature high-pressure refrigerant gas compressed by the compressor is discharged from the compression element 2 to fill the inside of the closed container 1, while the refrigerant gas is passed through a gap between the stator 5 and the rotor 6 of the motor 3 to cool the motor 3. Thereafter, the refrigerant gas is discharged from a discharge pipe 13 to outside. Lubricating oil 9 is accumulated in a lower portion of a high-pressure region within the closed container 1.

The compression element 2 includes a cylinder 21 fitted onto an inner surface of the closed container 1, and an upper-side end plate member 50 and a lower-side end plate member 60 fitted onto upper and lower opening ends of the cylinder 21, respectively. A cylinder chamber 22 is defined by the cylinder 21, the upper-side end plate member 50 and the lower-side end plate member 60.

The upper-side end plate member 50 has a disc-shaped body portion 51 and a boss portion 52 which is provided upwardly at a center of the body portion 51. The shaft 12 is inserted into the body portion 51 and the boss portion 52. The body portion 51 is provided with a discharge hole 51a which communicates with the cylinder chamber 22.

A delivery valve 31 is mounted on the body portion 51 in such a way that the delivery valve 31 is positioned on the side opposite to the cylinder 21 with respect to the body portion 51. This delivery valve 31 is, for example, a reed valve which opens and closes the discharge hole 51a.

A cup-type muffler cover 40 is mounted on the body portion 51 on the opposite side to the cylinder 21. The muffler cover 40 is fixed to the body portion 51 by a fixing member 35 (e.g., bolt). The boss portion 52 is inserted into the muffler cover 40.

A muffler chamber 42 is defined by the muffler cover 40 and the upper-side end plate member 50. The muffler chamber 42 is communicated with the cylinder chamber 22 via the discharge hole 51a.

The muffler cover 40 has a hole portion 43. The hole portion 43 allows the muffler chamber 42 to be communicated with an outside of the muffler cover 40.

The lower-side end plate member 60 has a disc-shaped body portion 61 and a boss portion 62 which is provided downwardly at a center of the body portion 61. The shaft 12 is inserted into the body portion 61 and the boss portion 62.

One end portion of the shaft 12 is supported by the upper-side end plate member 50 and the lower-side end plate member 60. That is, the shaft 12 is a kind of cantilever. One end portion (on the support end side) of the shaft 12 intrudes into the cylinder chamber 22.

An eccentric pin 26 is provided on the support end side of the shaft 12 in such a way that the eccentric pin 26 is positioned on the side of the compression element 2 in the cylinder chamber 22. The eccentric pin 26 is fitted onto a roller 27. The roller 27 is rotatably placed in the cylinder chamber 22 so that compression action is exerted by rotational movement of the roller 27.

In other words, the one end portion of the shaft 12 is supported by a housing 7 of the compression element 2 on both upper and lower sides of the eccentric pin 26. The housing 7 includes the upper-side end plate member 50 and the lower-side end plate member 60.

Next, compression action of the cylinder chamber 22 is explained.

Figure 2:
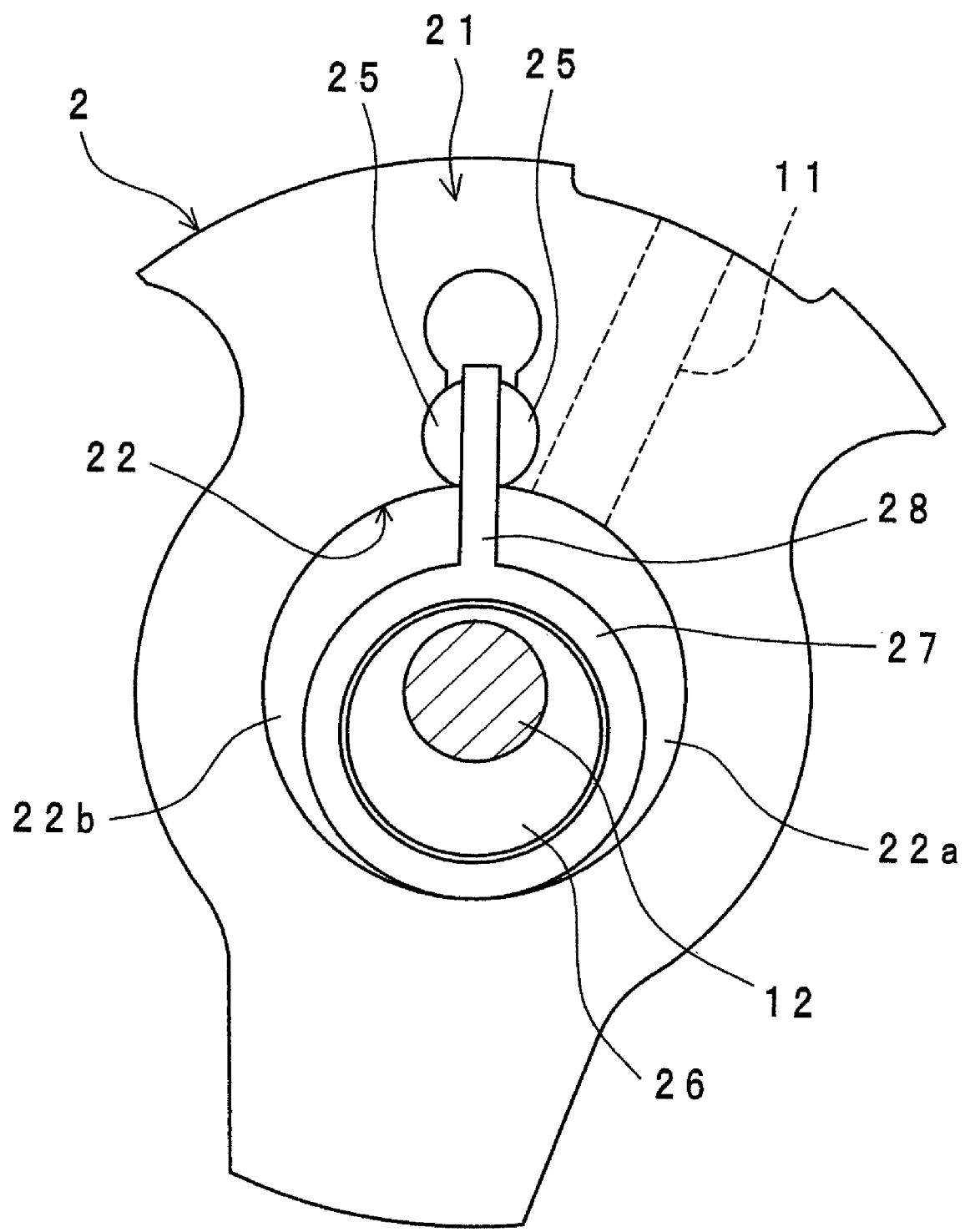
FIG. 2 shows a plan view of a main part of the compressor.

As shown in FIG. 2, the cylinder chamber 22 is internally partitioned by a blade 28 which is integrally provided with the roller 27. Specifically, a chamber on the right side of the blade 28 is a suction chamber (low-pressure chamber) 22a, where the suction pipe 11 is opened in the inner surface of the cylinder chamber 22. A chamber on the left side of the blade 28 is a discharge chamber (high-pressure chamber) 22b, where the discharge hole 51a (shown in FIG. 1) is opened in the inner surface of the cylinder chamber 22.

Semicircular-column-shaped bushes 25, 25 are set in close contact with both surfaces of the blade 28 to provide seal. Lubrication between the blade 28 and the bushes 25, 25 is implemented with the lubricating oil 9.

The eccentric pin 26 eccentrically rotates along with rotation of the shaft 12. Then, the roller 27 fitted onto the eccentric pin 26 rotates while part of the outer circumferential surface of the roller 27 keeps in contact with the inner circumferential surface of the cylinder chamber 22.

When the roller 27 rotates in the cylinder chamber 22, the blade 28 moves back and forth while both side faces of the blade 28 are held by the bushes 25, 25. Then, the low-pressure refrigerant gas is sucked from the suction pipe 11 into the suction chamber 22a and compressed into a high pressure refrigerant gas in the discharge chamber 22b. Thereafter, the high-pressure refrigerant gas is discharged from the discharge hole 51a (shown in FIG. 1).

Then, as shown in FIG. 1, the refrigerant gas discharged from the discharge hole 51a is discharged to the outside of the muffler cover 40 via the muffler chamber 42.

Figure 3:
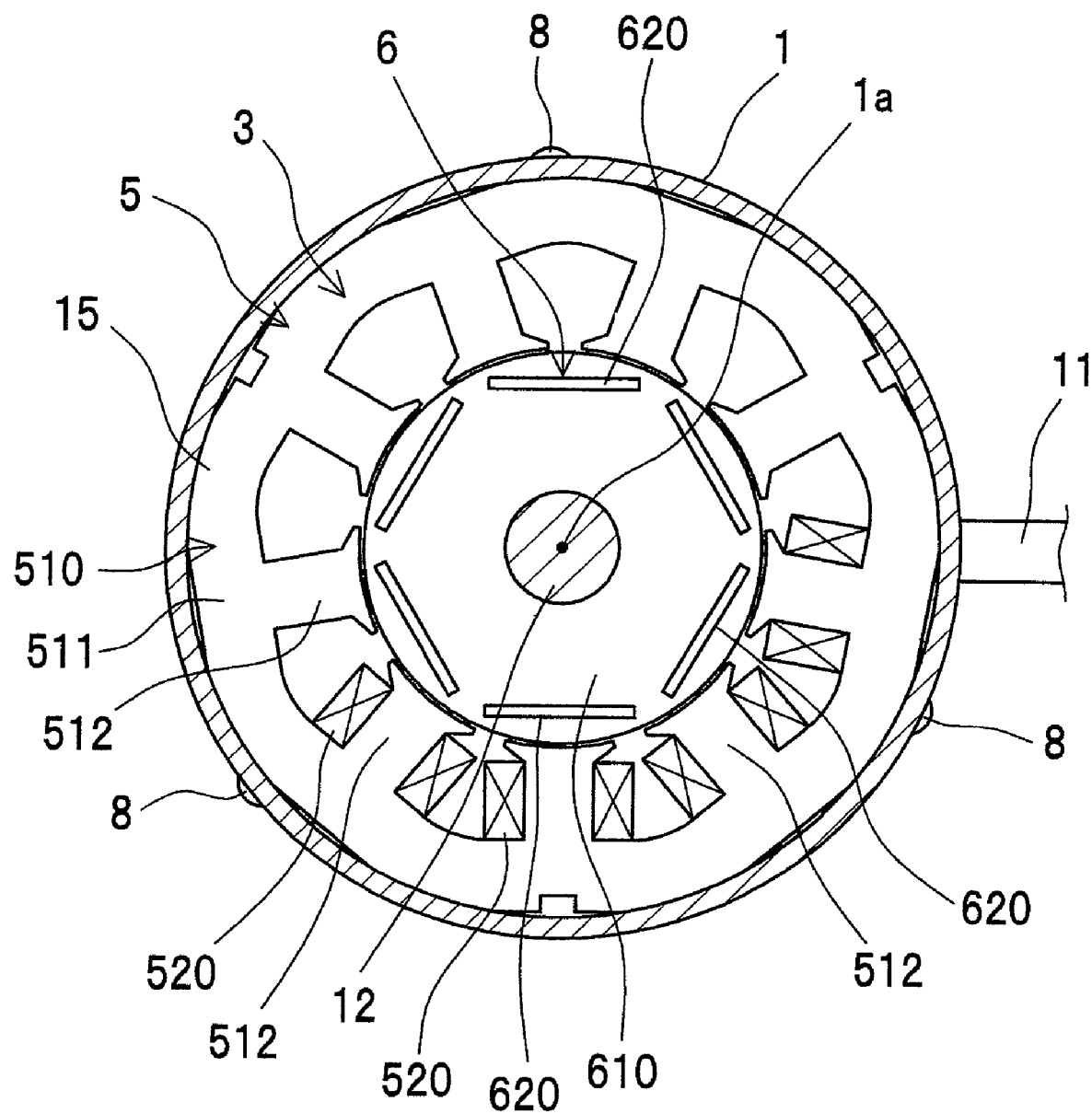
FIG. 3 shows a cross-sectional view of a motor in the compressor.

As shown in FIGS. 1 and 3, the motor 3 has the rotor 6 and the stator 5 which is placed radially outside of the rotor 6 via an air gap interposed therebetween.

The rotor 6 has a rotor body 610 and magnets 620 which is embedded in the rotor body 610. The rotor body 610 is cylindrical shaped and formed from, for example, multilayered electromagnetic steel plates. The shaft 12 is fitted into a central hole of the rotor body 610. Each of the magnets 620 is a flat permanent magnet. Six of the magnets 620 are arrayed at equal center-angle intervals in the circumferential direction of the rotor body 610.

The stator 5 has a stator core 510 and coils 520 which are wound around the stator core 510. In FIG. 3, the coils 520 are partly omitted for clearer illustration.

The stator core 510 has an annular portion 511 and nine teeth 512 which protrudes from an inner circumferential surface of the annular portion 511 to radially inside, and which is arrayed circumferentially at equal intervals. The coils 520 are wound respectively around the individual teeth 512, but not wound over the plurality of teeth 512. This is what we call a concentrated winding.

The motor 3 is a so-called 6-pole 9-slot motor. Electric current is passed through the coils 520 to generate electromagnetic force in the stator 5, so that the electromagnetic force rotates the rotor 6 along with the shaft 12.

As shown in FIG. 1, the stator core 510 is fitted onto the closed container 1 on two planes normal to a center axis 1a of the closed container 1. More specifically, an outer circumferential surface of the stator core 510 is welded onto the closed container 1 at three welding points 8 on each of the two planes, as shown in FIG. 3. The center axis 1a of the closed container 1 is coincident with a rotational axis of the shaft 12.

The welding points 8 are provided at an equal or unequal pitch. That is to say, center angles between neighboring ones of the welding points 8, 8 are equal to each other, or at least one of the center angles between neighboring ones of the welding points 8, 8 is different from the other center angles.

The welding points 8 on the two planes may either overlap or not overlap with each other as viewed in the direction along the center axis 1a.

The stator core 510 is formed from multilayered steel plates 15. All these steel plates 15 are fixed integrally by crimping for example.

According to the above-constructed compressor, as described above, the stator 5 is attached to the closed container 1 on the two planes normal to the center axis 1a of the closed container 1, where the stator 5 is welded to the closed container 1 at the three welding points 8 on each of the planes. Therefore, movement of the stator 5 can be reduced with respect to the closed container 1 in the direction along the center axis 1a (in the vertical direction).

In other words, it is possible to reduce the amount of steel plates 15 located between the fixed portion of the stator 5 to the closed container 1 and the end portion of the stator 5, in the direction of the center axis 1a. This makes it possible to reduce the individual movements of the loosened steel plates 15 therebetween in the direction of the center axis 1a. It should be noted that the neighboring fixed portions of the stator 5 firmly fix the steel plates 15 between the neighboring fixed portions to prevent these steel plates 15 from moving in the direction of the center axis 1a.

Thus, it is possible to reduce vibrations of the stator 5 caused by pressure pulsations of the refrigerant in the closed container 1. This allows realization of a low-noise compressor due to reduction in operation noise of the motor 3. In particular, the above-stated compressor is suitable for use during nighttime because the compressor can be operated with low noise during midnight, as in the case where this compressor is used for ecological hot-water supply utilizing nighttime electric power.

Although the carbon dioxide refrigerant is used at a high pressure in the closed container 1, the operating noise of the motor 3 is reduced because of reduction in vibrations of the stator 5 caused by pressure pulsations of the refrigerant.

Next, the compressor of the invention is compared with a compressor of the prior art concerning vertical-direction vibrations of the stator by a test using a vibration exciter.

Figure 4A:
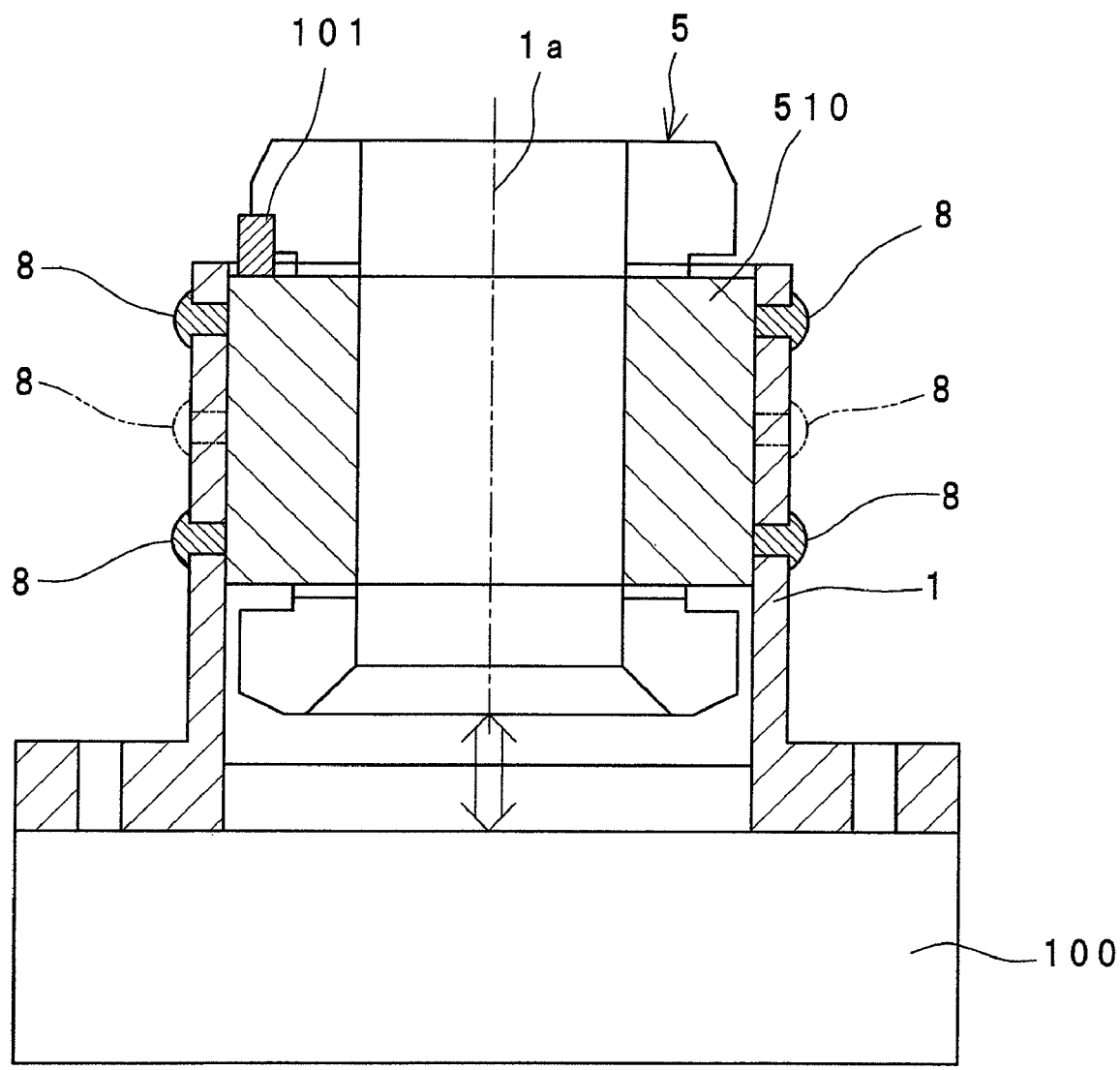
FIG. 4A shows a longitudinal sectional view of a test compressor used for a vertical vibration test of a stator of the motor.

According to the compressor of the invention, as shown in the longitudinal sectional view of FIG. 4A, the stator 5 is attached to the closed container 1 on two planes normal to the center axis 1a of the closed container 1. Also, as shown in the plan view of FIG. 4B, the stator 5 is welded to the closed container 1 at four welding points 8 on each of the planes. In the conventional compressor, on the other hand, a vertically central portion of the stator 5 is welded to the closed container 1 at four welding points 8, as shown by imaginary lines (dotted lines) in FIG. 4A, where the same reference numeral is used in common for the compressor of the invention and the conventional compressor.

Figure 4B:
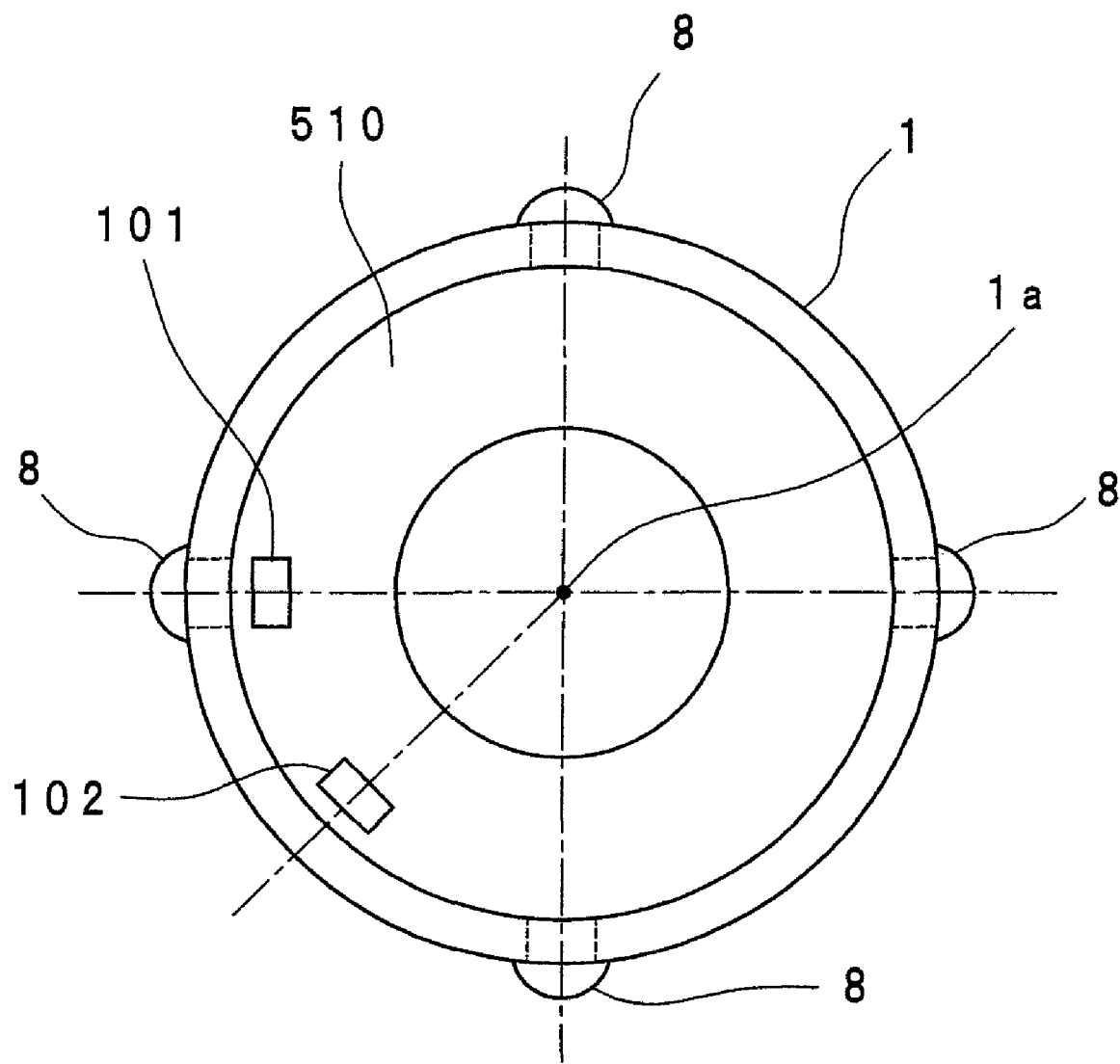
FIG. 4B shows a plan view of the test compressor used for the vertical vibration test of the stator.

The four welding points 8 are provided at an equal interval, as shown in FIGS. 4A and 4B. A first acceleration sensor 101 is mounted on an intersection line in an upper surface of the stator core 510, where the intersection line is formed by intersection of the upper surface of the stator core 510 and a plane including the entire center axis 1a and the one of the welding points 8. A second acceleration sensor 102 is mounted on the upper surface of the stator core 510 and at the same time on the bisector of a center angle formed between neighboring welding points 8, 8. A vibration exciter 100 is mounted on a lower surface of the closed container 1.

Then, the vibration exciter 100 gives vibrations in the vertical direction to the stator 5 together with the closed container 1. Vertical-direction vibration accelerations of the upper surface (i.e., upper-end steel plate 15) of the stator core 510 are measured by using the first acceleration sensor 101 and the second acceleration sensor 102.

Thereafter, a relationship is determined between the frequency of the vibration exciter 100 and the vertical-direction vibration acceleration of the upper surface of the stator core 510.

Figure 5A:
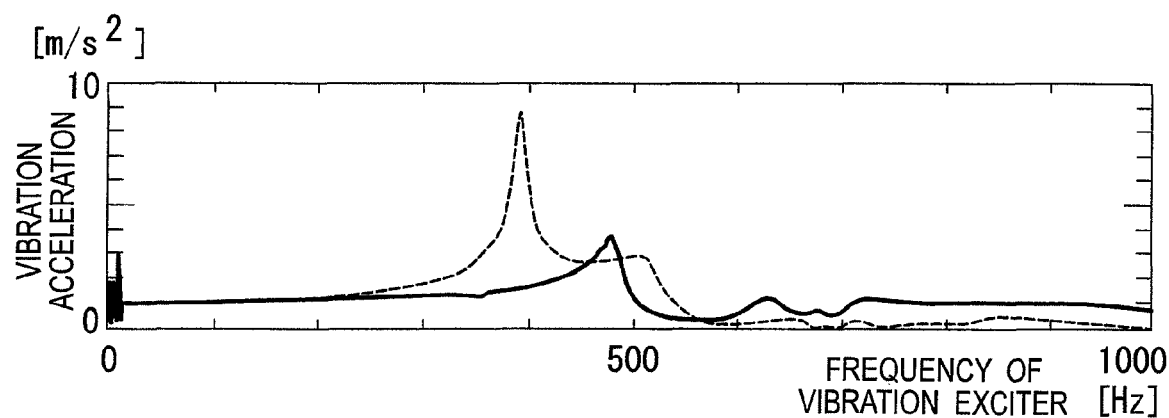
FIG. 5A shows a graph showing a result measured by a first acceleration sensor.
Figure 5B:
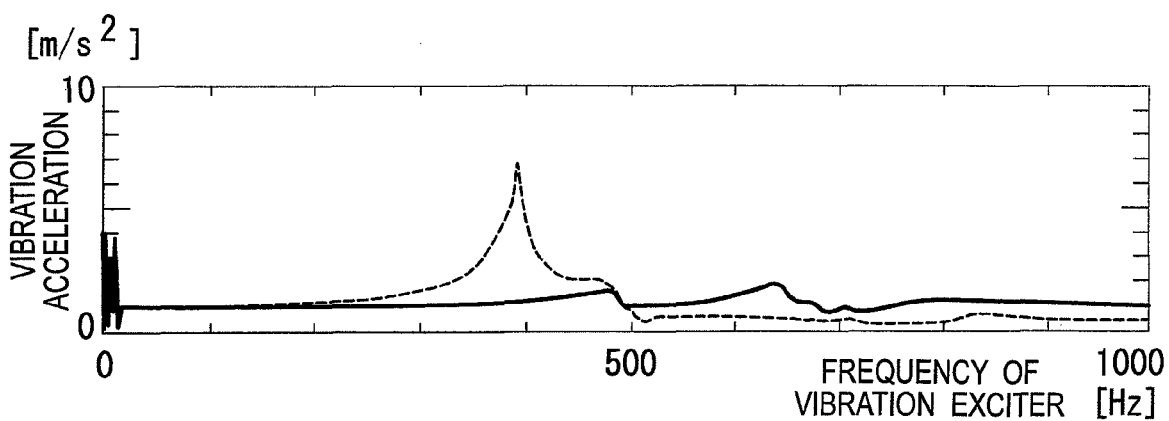
FIG. 5B shows a graph showing a result measured by a second acceleration sensor.

FIG. 5A shows a result measured by the first acceleration sensor 101. FIG. 5B shows a result measured by the second acceleration sensor 102. In FIGS. 5A and 5B, a result regarding the compressor of the invention is plotted by solid line, and a result regarding the conventional compressor is plotted by dotted line.

As can be seen from FIGS. 5A and 5B, the vibration acceleration of the conventional compressor is enormously large at a frequency 400 Hz of the vibration exciter 100, compared with the other frequencies thereof. Meanwhile, the vibration acceleration of the compressor according to the invention becomes large at a frequency of 480 Hz of the vibration exciter 100, but its value at 480 Hz is quite smaller than the maximum vibration acceleration of the conventional compressor.

That is, the compressor of the invention makes it possible to reduce the vertical-direction vibrations of the stator, compared with the conventional compressor. Generally, the frequency of pressure pulsations of the refrigerant in the closed container 1 is less than 1 kHz, specifically around 400 Hz. Therefore, the pressure pulsations of the refrigerant remarkably increase vibration of the stator in the conventional compressor, which causes operation noise, while vibration of the stator is reduced in the compressor of the present invention.

Second Embodiment

Figure 6:
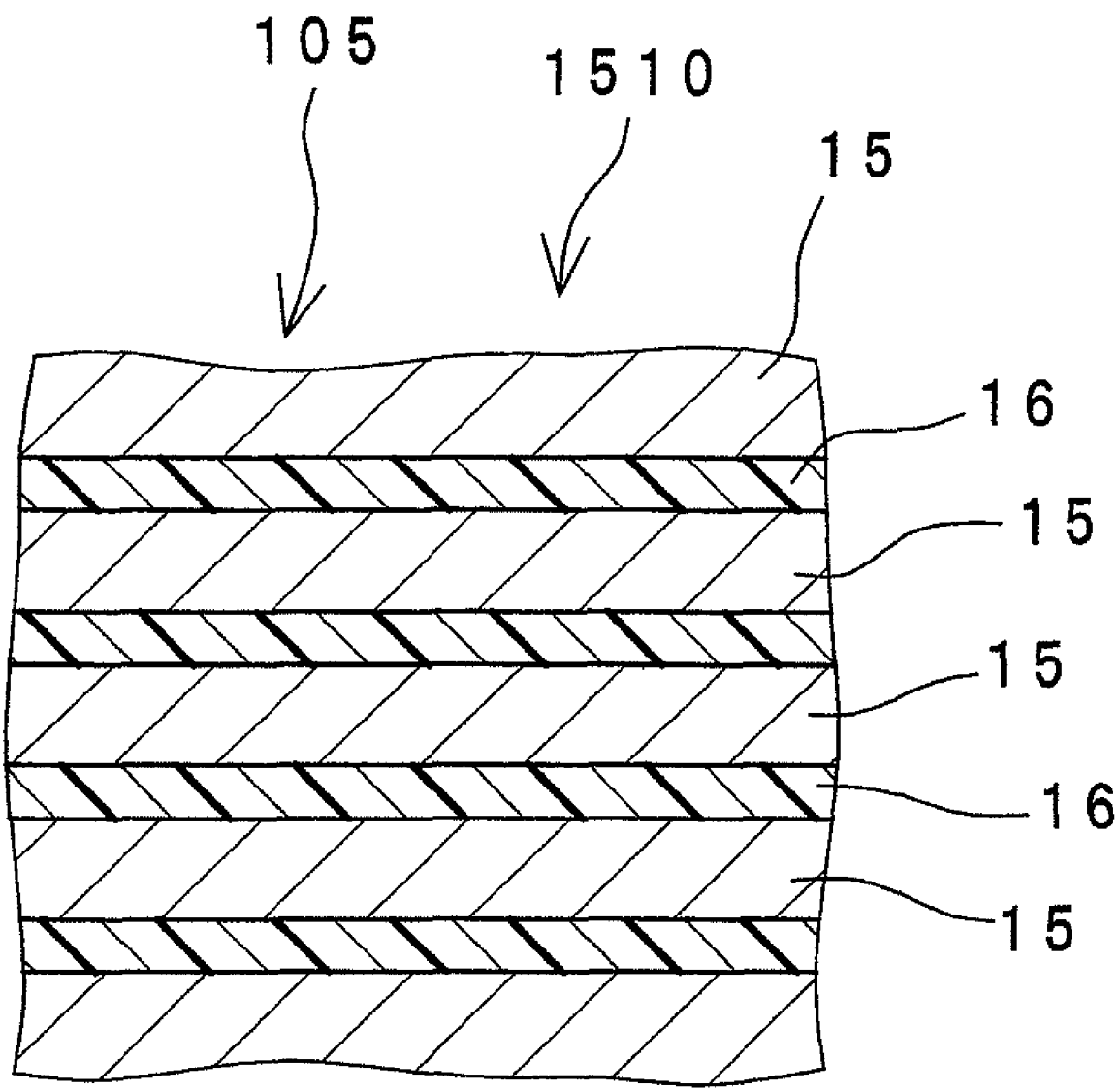
FIG. 6 shows an enlarged sectional view of a part of the compressor according to a second embodiment of the invention.

FIG. 6 shows a part of a compressor according to a second embodiment of the invention, where the stator is different in structure from the first embodiment.

A stator 105 of the second embodiment includes a stator core 1510 having multilayered steel plates 15. Neighboring steel plates 15, 15 are bonded to each other with insulating adhesive 16. The insulating adhesive 16 is epoxy-based varnish, for example.

Thereby, the plurality of steel plates 15 are loosened apart from one another, so that the rigidity of the stator 105 is improved. This makes it possible to further reduce the vibrations of the stator 105 caused by pressure pulsations in the closed container 1, so that the operating noise of the motor 3 is further reduced.

In addition, when the entire surface of each of the steel plates 15 is covered with the insulating adhesive 16, the rigidity of the stator 105 is even more improved, so that the operating noise of the motor 3 can be even more reduced.

The following is a comparison regarding the operating noise between a compressor where the steel plates are bonded with varnish and a compressor where the steel plates are not bonded with varnish.

Figure 7:
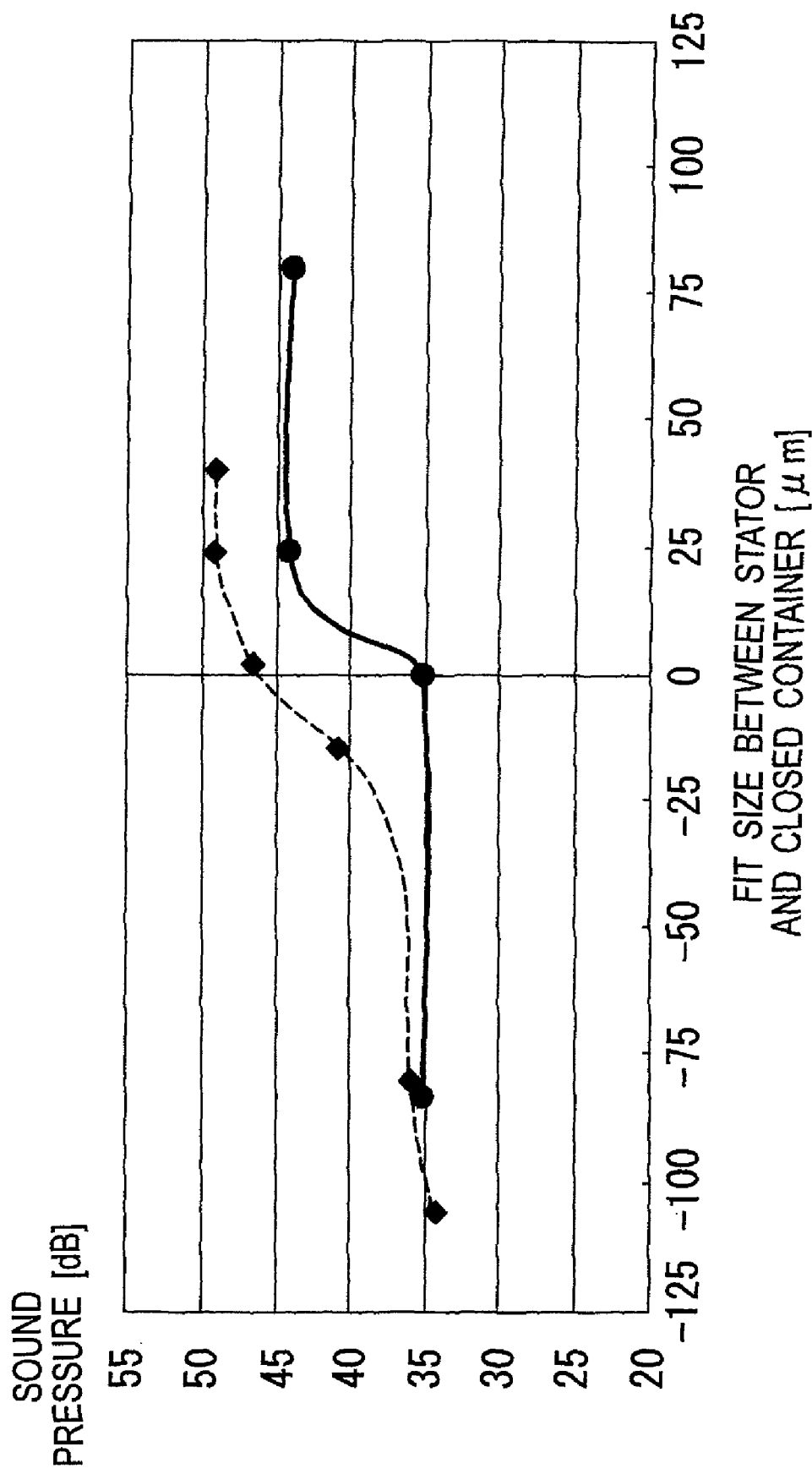
FIG. 7 shows a graph of relationship between fit size of the stator versus the closed container and sound pressure of the compressor with regard to a compressor with varnish and a compressor with no varnish.

FIG. 7 shows a relationship between fit size of the stator versus the closed container and sound pressure of the compressor at a frequency of 400 Hz. The horizontal axis represents tolerances of the stator versus the closed container. Positive values indicate a state of clearance fit while negative values indicate a state of interference fit. The vertical axis represents sound pressure of the compressor. A result of the compressor with varnish is plotted by solid line, while that with no varnish is by dotted line.

As can be seen from FIG. 7, the compressor with varnish is more greatly reduced in its sound pressure in comparison with the compressor with no varnish when the fit size between stator and closed container has a positive value, that is, when the stator and the closed container are in a clearance-fit state.

Figure 8:
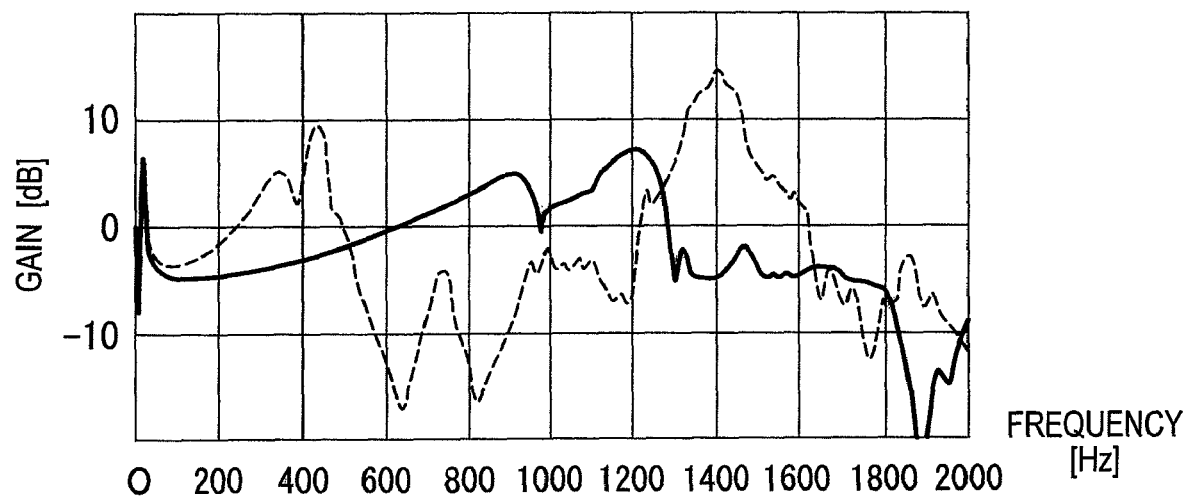
FIG. 8 shows a graph of relationship between frequency and gain with regard to a compressor with varnish and a compressor with no varnish.

FIG. 8 shows a relationship between frequency and gain (vibrational sound) in the case of a fit size of 85 μm between the stator and the closed container, regarding the compressor with varnish and the compressor with no varnish. In FIG. 8, the horizontal axis represents frequency, and the vertical axis represents gain. A result of the compressor with varnish is plotted by a solid line, while that of the compressor with no varnish is plotted by a dotted line.

As can be seen from FIG. 8, in the case of the compressor with no varnish (see the dotted line), the gain is large around a frequency of 400 Hz. Whereas, in the case of the compressor with varnish (see the solid line), the gain is small around the frequency of 400 Hz. Accordingly, the operating noise of the compressor caused by the pressure pulsations of the refrigerant is much more reduced in the case of the compressor with varnish, compared with the compressor with no varnish, because the pressure pulsation frequency of the refrigerant in the closed container 1, which would matter in terms of operating noise, is generally 1 kHz or lower, more specifically around 400 Hz.

Third Embodiment

Figure 9:
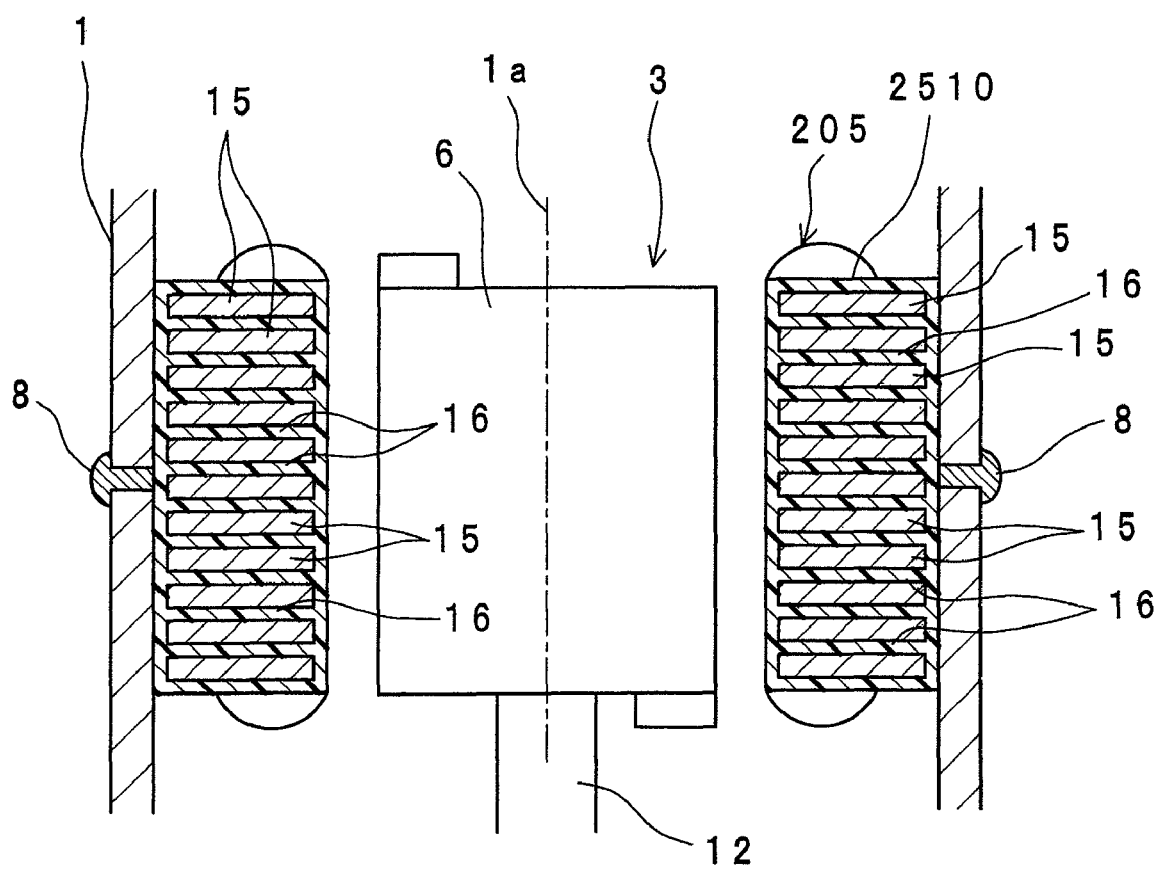
FIG. 9 shows a longitudinal sectional view of a part of the compressor according to a third embodiment of the invention.

FIG. 9 shows a part of the compressor according to a third embodiment of the invention, where the stator is different in structure from the first embodiment.

A stator 205 in the third embodiment is mounted to the closed container 1 and on a plane normal to the center axis 1$a$ of the closed container 1. On the plane, the stator 205 is welded to the closed container 1 at three or more welding points 8. Specifically, as shown in FIG. 9, a vertically central portion of a stator core 2510 is welded at the points 8 to the closed container 1, where the vertical direction is a direction along the center axis 1$a$.

The stator core 2510 has multilayered steel plates 15. Neighboring steel plates 15, 15 are bonded to each other with insulating adhesive 16. Specifically, the entire surface of each of the steel plates 15 is covered with the insulating adhesive 16. The insulating adhesive 16 is epoxy-based varnish, for example.

The above-structured compressor allows reduction in vertical movement of the stator 205 relative to the closed container 1. This is because, as stated above, the stator 205 is mounted to the closed container 1 by welding at three or more welding points 8 on one plane normal to the center axis 1$a$ of the closed container 1, as neighboring steel plates 15, 15 of the stator 205 are bonded to each other with the insulating adhesive 16.

Thus, the plurality of steel plates 15 do not become loosened apart from one another, so that the rigidity of the stator 205 is improved. This makes it possible to reduce the vibrations of the stator 205 caused by pressure pulsations of the refrigerant in the closed container 1, and therefore, it is possible to realize a low-noise compressor reduced in operating noise of the motor 3.

When carbon dioxide in particular is used as the refrigerant, this refrigerant becomes high pressure in the closed container 1. However, the structure of this embodiment reduces vibrations of the stator 205 caused by pressure pulsations of the refrigerant, so that the operating noise of the motor 3 is reduced.

Also, the rigidity of the stator 205 is much more improved by covering the entire surface of each of the steel plates 15 with the insulating adhesive 16. This makes it possible to further reduce the operating noise of the motor 3.

It should be noted that the present invention is not limited to the above-described embodiments. For example, the compression element 2 may be a rotary type one where its roller and blade are separately provided. Also, the compression element 2 may be a scroll type or reciprocating type besides the rotary type. Further, the compression element 2 may be a two-cylinder type having two cylinder chambers. The coils 520 may be made by the so-called distributed winding where the coils 520 are wound over the plurality of teeth 512.

The stator 5, 105 may be mounted to the closed container 1 on three or more planes normal to the center axis 1a of the closed container 1 in the first and second embodiments. Also, at four or more welding points 8 on each of the planes, the stator 5, 105 may be welded to the closed container 1.

All the steel plates 15 may be integrally fixed with bolts, rivets or other like fixtures instead of the insulating adhesive 16 in the second and third embodiments. End faces of all the steel plates 15 may be integrally fixed by welding to improve the rigidity of the stator.

What is claimed is:

1. A compressor for compressing refrigerant in an air conditioner or a refrigerator, comprising:
   a closed container;
   a compression element disposed in the closed container; and
   a motor disposed in the closed container, the motor driving the compression element via a shaft,
   the motor having a stator that is in a clearance-fit state to the closed container and attached to the closed container on at least two planes normal to a center axis of the closed container,
   the stator being welded to the closed container at least three welding points on each of the planes,
   the stator having multilayered steel plates, and
   neighboring steel plates of the multilayered steel plates being bonded to each other with insulating adhesive so as to remove a peak around 400 Hz of a vibrational sound caused by the compressor due to pressure pulsations of the refrigerant within the closed container when the multilayered steel plates are not bonded to each other, the compressor having no peak of the vibrational sound at least in a range of 200 Hz to 600 Hz.

2. The compressor as set forth in claim 1, wherein carbon dioxide is used as a refrigerant in the closed container.

3. The compressor as set for the in claim 1, wherein a clearance greater than 0 μm up to 85 μm is provided between the closed container and the stator to make the clearance fit.

4. A compressor for compressing refrigerant in an air conditioner or a refrigerator, comprising:
   a closed container;
   a compression element disposed in the closed container; and
   a motor disposed in the closed container, the motor driving the compression element via a shaft,
   the motor having a stator that is in a clearance-fit state to the closed container and attached to the closed container on one plane normal to a center axis of the closed container,
   the stator being welded to the closed container at least three welding points on the one plane,
   the stator having multilayered steel plates, and
   neighboring steel plates of the multilayered steel plates being bonded to each other with insulating adhesive so as to remove a peak around 400 Hz of a vibrational sound caused by the compressor due to pressure pulsations of the refrigerant within the closed container when the multilayered steel plates are not bonded to each other, the compressor having no peak of the vibrational sound at least in a range of 200 Hz to 600 Hz.

5. The compressor as set forth in claim 4, wherein carbon dioxide is used as a refrigerant in the closed container.

6. The compressor as set for the in claim 4, wherein a clearance greater than 0 μm up to 85 μm is provided between the closed container and the stator to make the clearance fit.

* * * * *